United States Patent [19]

Tao

[11] Patent Number: 5,521,449
[45] Date of Patent: May 28, 1996

[54] METHOD AND CIRCUITRY FOR REDUCING RADIATED NOISE IN A STROBED LOAD DRIVER CIRCUIT FOR A VACUUM FLUORESCENT DISPLAY

[75] Inventor: Qi Tao, Flint, Mich.

[73] Assignee: Delco Electronics Corporation, Kokomo, Ind.

[21] Appl. No.: 519,863

[22] Filed: Aug. 28, 1995

[51] Int. Cl.$^6$ .................................................. H05B 37/02
[52] U.S. Cl. .......................... 315/169.1; 315/77; 315/307
[58] Field of Search .................................. 315/77, 169.1, 315/307, 291, 224

[56] References Cited

U.S. PATENT DOCUMENTS

| | | | |
|---|---|---|---|
| 4,968,917 | 11/1990 | Harris | 315/169.1 |
| 5,365,146 | 11/1994 | Kadwell | 315/169.1 |
| 5,477,108 | 12/1995 | Kadwell | 315/169.1 |

Primary Examiner—Robert Pascal
Assistant Examiner—Michael B. Shingleton
Attorney, Agent, or Firm—Jimmy L. Funke

[57] ABSTRACT

In accordance with the present invention, noise suppression circuitry is described for reducing noise, AM band noise in particular, radiated from a strobed load driver circuit. The load driver circuit includes a low-voltage latch circuit for latching data relating to the load to a plurality of high-voltage load driver circuits, each connected to a source of high-voltage. The noise suppression circuitry is operable to receive a data strobe signal from a signal source, such as a microprocessor, and to decrease the high voltage to the plurality of high-voltage load driver circuits at a predetermined rate. When the voltage has decreased to a predetermined level, the latch circuit is provided with a data strobe signal to thereby latch the data to the high-voltage load driver circuits under low voltage conditions, thus significantly reducing the AM band noise radiated from the strobed load driver circuit.

18 Claims, 11 Drawing Sheets

METHOD AND CIRCUITRY FOR REDUCING RADIATED NOISE IN A STROBED LOAD DRIVER CIRCUIT FOR A VACUUM FLUORESCENT DISPLAY

FIELD OF THE INVENTION

The present invention relates generally to circuitry for reducing radiated noise in integrated circuitry, and more specifically to circuitry for reducing such noise in strobed load driver circuits.

BACKGROUND OF THE INVENTION

In the past few decades, technological advances have made the use of vacuum florescent (VF) displays an aesthetically pleasing and relatively inexpensive alternative to back-lit displays. Examples of electronic systems and components utilizing such VF displays include entertainment systems, such as video and audio systems, kitchen appliances, such as conventional and microwave ovens, and automotive systems, such as automotive entertainment systems and instrument clusters, to name a few.

One specific example of an automotive electronic system utilizing a VF display is a so-called head up display (HUD) system wherein at least some of the vehicle's operational information typically associated with the vehicle instrument cluster is projected onto the interior surface of the windshield with a multi-segment VF display unit. The vehicle operator may then obtain such information without diverting his/her line of vision from the road ahead. Typical information so displayed may include vehicle speed, engine RPM, fuel quantity remaining, and the like.

One downside of using a VF display in such a HUD application is that the VF display generally requires high voltages for sufficient illumination of the multiple segments (typically on the order of 60 volts). A high-voltage load driver integrated circuit (IC) or equivalent is thus required to provide high-voltage drive to the multiple display segments. Although such high-voltage load drivers are known, and readily available, their operation in such an application inherently generates significant electronic noise. It is known that such noise in the FM band (88 MHZ–108 MHZ) may be minimized via optimal circuit board layout and passive filtering, but noise in the AM band (500 kHz–1500 kHz) is generally not susceptible to significant reduction by using conventional techniques. As an example of such AM band noise generation, a known 32-bit high-voltage VF driver IC, operated in duplex mode to illuminate a VF HUD, typically radiates between 45 dbµv/m and 65 dbµv/m of noise in the AM band.

In the near future, radiated emission guidelines for automotive applications will require less than 28 dbµv/m of AM band noise per system. In order to meet such a requirement, a 20 dbµv/m–40 dbµv/m improvement must be made over known technology. What is therefore needed is a technique for reducing radiated emission from high-voltage load driver IC applications such as, for example, those used in VF HUD systems. The technique should ideally reduce radiated emissions to within acceptable levels, be easily integrated into existing systems, and be cost-effectively implemented.

SUMMARY OF THE INVENTION

The forgoing shortcomings of the prior art are addressed by the present invention. In accordance with one aspect of the present invention, a noise suppression circuit is provided for reducing noise radiated from a load driver circuit. The load driver circuit has a high-voltage supply input connected to a plurality of high-voltage driver circuits and a strobe input connected to a data latch circuit for latching low-voltage data to the plurality of high-voltage driver circuits. The noise suppression circuit comprises a first input connected to a signal source for receiving a first strobe signal therefrom, a second input connected to a source of high-voltage and a first output connected to the high-voltage supply input of the load driver circuit. The first output supplies high voltage from the second input to the high-voltage supply input of the driver circuit when the first strobe signal is deactivated. The first output further decreases the high voltage to a low voltage level at a predetermined decrease rate in response to an activating edge of the first strobe signal. The load driver circuit is responsive to a second strobe signal received at the strobe input thereof after the first output has decreased to the low voltage level to thereby latch low-voltage data to the plurality of high-voltage driver circuits.

In accordance with another aspect of the present invention, a method of reducing radiated noise from a load driver circuit is provided. The load driver circuit has a first input coupled to a source of high-voltage and connected to a plurality of high-voltage driver circuits, and a second input connected to a latch circuit for latching low-voltage data to the high-voltage driver circuits. The method comprises the steps of: (1) decreasing the high-voltage level at the first input at a first predetermined rate, (2) providing a strobe signal to the second input after the voltage level at the first input decreases to a first voltage level, (3) deactivating the strobe signal at the second input after the low-voltage data is latched to the plurality of high-voltage driver circuits, and (4) increasing the voltage level at the first input from the first voltage level to the high-voltage level at a second predetermined rate.

One object of the present invention is to provide a noise suppression circuit operable to decrease the supply voltage to a strobed load driver integrated circuit, and to strobe data to the load driver outputs while the supply voltage to the load driver integrated circuit is below a predetermined voltage level.

Another object of the present invention is to provide a general method of reducing noise radiated from a strobed load driver integrated circuit.

These and other objects of the present invention will become more apparent from the following description of the preferred embodiment.

DESCRIPTION OF THE PREFERRED EMBODIMENT

Figure 1:
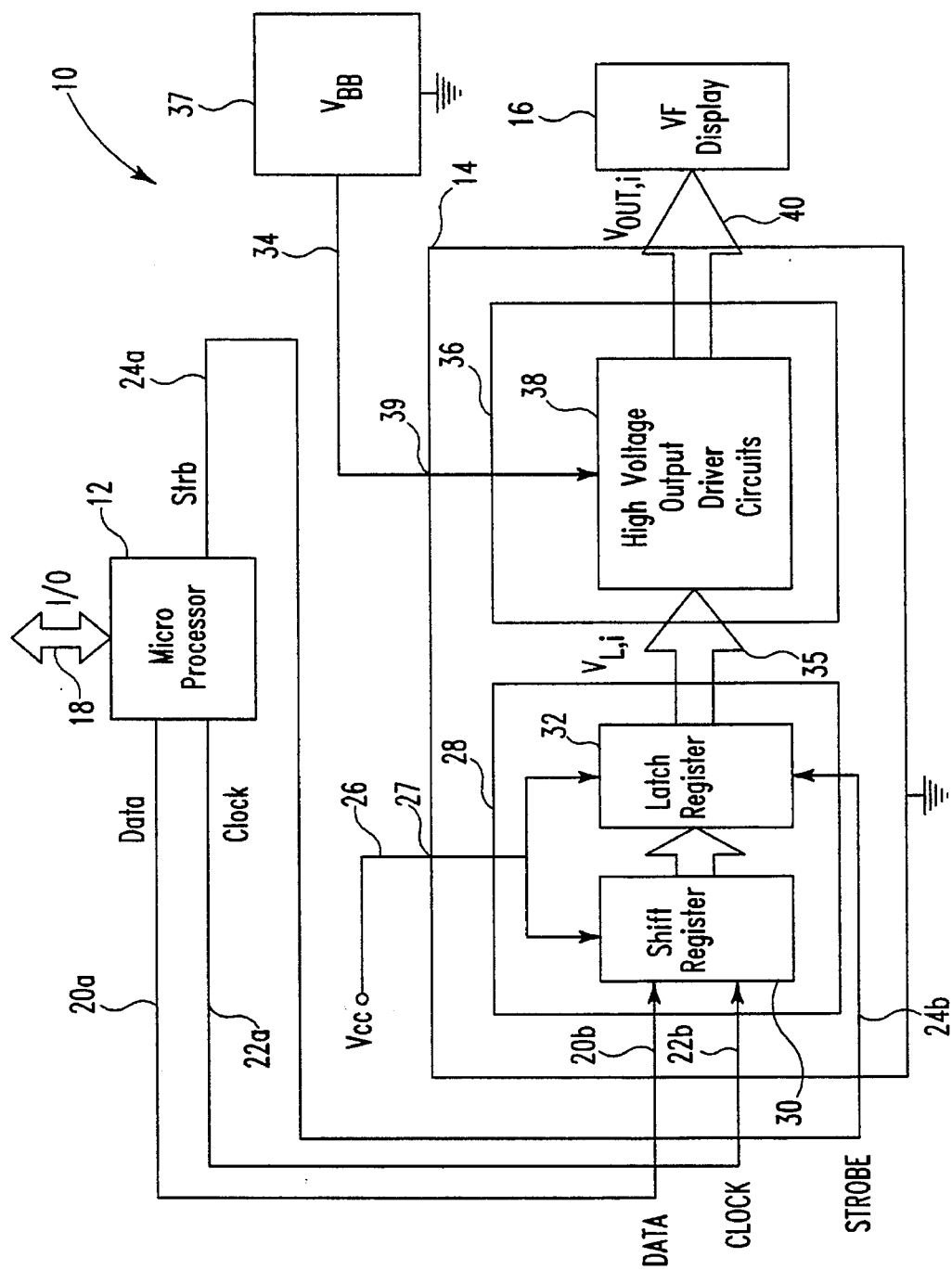
FIG. 1 is a schematic diagram showing a prior art VF display driving system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a prior art system 10 for driving a multi-segment VF display 16 is shown. System 10 includes a microprocessor 12 which provides a number of control signals to a load driver circuit 14 which, in turn, drives multi-segment VF display 16. Microprocessor 12 includes an I/O interface 18 which receives a number of input signals from various sensors and other input sources, and provides output signals to control other related and unrelated system functions. In particular, microprocessor 12 includes a data output line 20a which is connected to a data input line 20b of load driver circuit 14, a clock output line 22a which is connected to a clock input line 22b of load driver circuit 14, and a strb line 24a which is connected to a strobe input line 24b of load driver circuit 14. Microprocessor 12 is operable, as is known, to provide data, clock and strb signals in order to control the operation of load driver circuit 14.

Load driver circuit 14 is typically provided as a single integrated circuit (IC) having a low-voltage supply input 26 ($V_{CC}$) connected to a low-voltage supply input 27 of IC 14, and a high-voltage supply 37 ($V_{BB}$) connected to a high-voltage supply input 39 high-voltage supply line 34. $V_{CC}$ 26 is generally within the range of 3–7 volts, and is typically provided from a 5 volt supply. $V_{BB}$ 37, on the other hand, is generally much greater than $V_{CC}$, with typical supply voltages in the range of 50–60 volts. $V_{CC}$ 26 is connected to a low-voltage section 28 of load driver IC 14 to thereby provide low-voltage thereto. Low-voltage section 28 includes a shift register 30 which is responsive to the data 20a and clock 22a lines of microprocessor 12 to receive data relating to the illumination status of the various segments of the multi-segment VF display 16. Shift register 30 provides the data, under control of the clock signal provided by the microprocessor 12, to a latch register 32 which forms a part of the low-voltage section 28 of the load driver IC 14. The latch register 32 is operable, under the control of a strobe signal provided on the strobe line 24a by the microprocessor 12, to latch the data from the shift register 30 to the high-voltage section 36 of the load driver IC 14. In so doing, latch register 32 includes a data output port 35 which is arranged to provide a number of low-voltage control signals $V_{L,i}$, where "i" corresponds to the number of display segments in the multi-segment VF display 16.

High-voltage section 36 includes a number, i, of high-voltage output driver circuits 38. Each of the circuits 38 are connected to a corresponding control signal $V_{L,i}$ of data output port 35, to the high-voltage supply input 39, and to a high-voltage output port 40. In operation, the high-voltage output driver circuits 38 are each responsive to a corresponding low-voltage control signal $V_{L,i}$ to provide a high-voltage drive signal $V_{OUT,i}$ at high-voltage output port 40 to thereby drive a corresponding segment of the multi-segment VF display 16.

Figure 2:
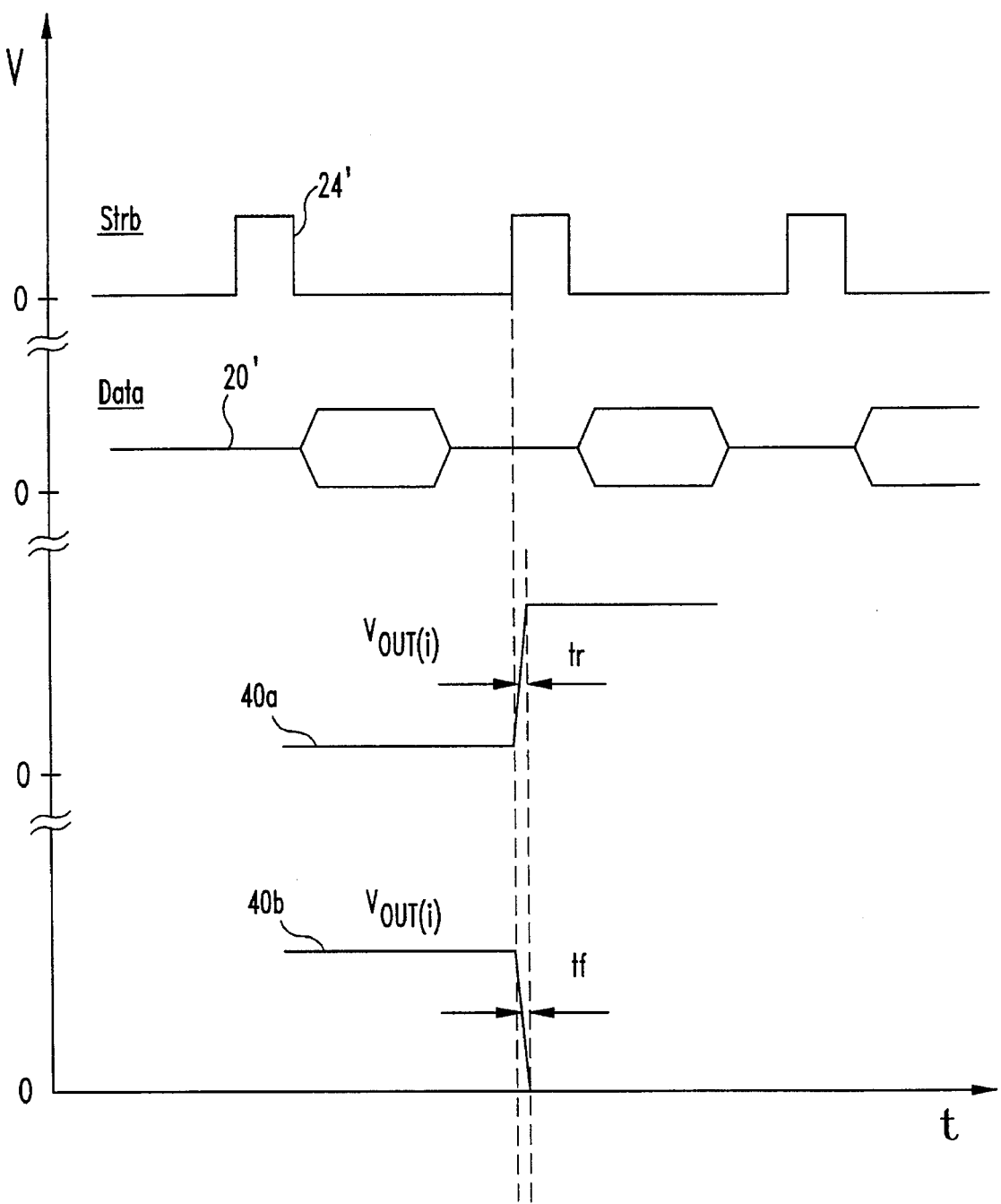
FIG. 2 is a waveform diagram showing typical operation of the VF display driving system of FIG. 1.

Referring now to FIGS. 1 and 2, a more detailed description of the operation of system 10 will be provided. Microprocessor 12 is operable, as previously discussed, to clock data 20' into the shift register 30 of the load driver IC 14, wherein the data 20' clocked therein corresponds to a particular illumination pattern of the multiple segments of the VF display 16. The clock signal provided by microprocessor 12 occurs several times per second so that the data 20' supplied to the load driver IC 14 changes at a corresponding rate. In this way, the various segments of the VF display are continually updated to thereby simulate analog operation of the display. In order to effectuate the periodic updating of the data, microprocessor 12 supplies a strb signal 24' on strb line 24a. The latch register circuitry 32 is responsive to the strb signal 24' to latch data to the high-voltage output driver circuits on each rising edge thereof. Alternatively, latch register circuiting 32 may be configured to latch data to the high-voltage output driver circuits on each falling edge thereof. Thus, each $V_{OUT,i}$ 40a low-to-high transition occurs within a rise time $t_r$ of the rising edge of the strb signal 24', and each $V_{OUT,j}$ 40b high-to-low transition occurs within a fall time $t_f$ of the rising edge of the strb signal 24'.

Operation of the VF display driver system 10, as previously described, is known to generate significant noise. Heretofore, it has been generally believed that the total radiated noise due to the operation of such a high-voltage load driver system is the sum of a noise component attributable to the high-voltage load driver IC 14 and a noise component attributable to the high-voltage power supply 37. Thus, Noise(total)=Noise(load driver IC)+Noise(high-voltage power supply). Since high-voltage power supplies (HVPS) commonly used for such high-voltage load driver systems are known to generate approximately 45–55 dbµv/m of noise, and the total noise typically generated by such systems is typically 60–70 dbµv/m, it has generally been thought that the HVPS is the dominant noise source in such high-voltage load driver systems.

Through experimentation, it has been determined that the above noise equation is not accurate, at least for a high-voltage load driver system of the type shown herein. The actual noise relationship should instead be represented by the equation Noise(total)=Max{Noise(load driver IC), Noise(HVPS)}+Nm(f), where Nm(f) is a sum of interference noise sources at particular frequencies. Unless the noise(total) shape is very irregular, Nm(f) is small for most frequencies. Generally, Nm(f) is less than 10 dbµv/m, and Nm(f) values of ±6 dbµv/m are typical. Thus, Max{Noise(load driver IC), Noise(HVPS)} ~55–65 dbµv/m for typical high-voltage load driver systems such as system 10 in FIG. 1. Since Noise(HVPS) is generally known to be 45–55 dbµv/m, the dominant source of radiated noise thus appears to be attributable to the load driver IC, rather than to the HVPS as previously believed.

Figure 3:
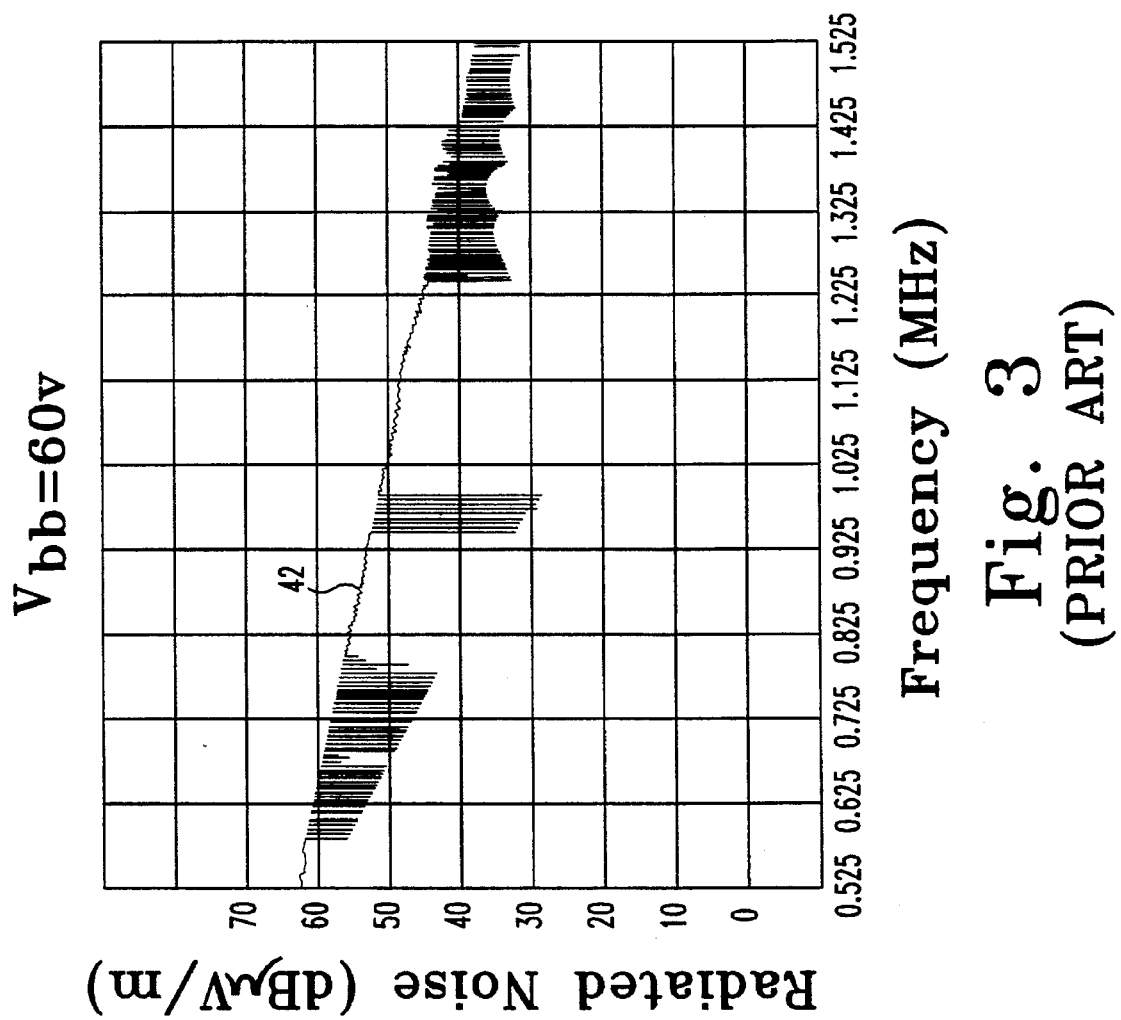
FIG. 3 is a plot of radiated noise versus frequency, showing AM band noise radiated from the high-voltage VF driver IC of FIG. 1.

Referring now to FIG. 3, a plot of noise 42, in the AM band of frequencies, radiated by the load driver IC 14 of FIG. 1 during normal operation thereof, is shown wherein a noise free battery was used as the high-voltage power supply. The radiated noise 42, as shown in FIG. 3, may be as much as 65 dbµv/m, which is 37 dbµv/m higher than the maximum allowable noise level of 28 dbµv/m. Significantly, the plot of FIG. 3 tends to prove the accuracy of the modified noise equation set forth above, indicating that normal operation of the load driver IC 14 is the dominant source of radiated noise, particularly in the AM band. The present invention, described hereinafter, addresses this concern by providing a method and circuit embodiment for decreasing radiated noise in such a VF display driver system to acceptable levels.

Through further experimentation, it has been determined that the load driver circuit 14 does not generate significant noise when the strb 24a line is deactivated (disabled), or when none of the data latched to the high-voltage output driver circuits 38 has changed state from the previous clock cycle. However, approximately 55–65 dbµv/m of noise is generated by load driver IC 14 when at least 7–10 outputs ($V_{OUT,i}$) change state, as shown in the example plot of FIG. 3.

It is generally known that electric field strength at a given location for a given device is given by the equation: $E(f) = M/(t_{rf} * f^2)$, where M is a quantity dictated by distance between the antenna and device, board layout and other factors, and is generally constant in a physical system, $t_{rf}$ is the rise or fall time of the event causing the electric field, and f is the frequency of the electric field. Assuming that the data strobe event described above is the dominant source of radiated noise in system 10, adjusting $t_r$ and $t_f$ of $V_{OUT,i(j)}$ (FIG. 2) should provide a corresponding reduction in radiated noise. With an original $t_r$ and $t_f$ of approximately 0.2 micro seconds, it has been determined by solving well known equations that radiated noise in the AM band of frequencies can be reduced to less than 28 dbµv/m by increasing $t_r$ and $t_f$ of $V_{OUT, i(j)}$ to at least 8 micro seconds. It is to be understood, however, that the data strobe event described above is a specific example of a noise operating event associated with the operation of a high-voltage system. As such, "strobe", as used hereinafter, should be understood as being any accessible (often external) event that is associated with noise generated by a high-voltage system.

One way of reducing noise radiated from load driver IC 14, in accordance with the foregoing concepts, is to gradually reduce the voltage $V_{BB}$ of the high-voltage power source prior to activating a strobe event, and then gradually increasing $V_{BB}$ after the strobe event has occurred and data has been latched. In other words, radiated noise is reduced if data can be latched to the high-voltage output driver circuits 38 while $V_{BB}$ is at a reduced level, and the $V_{BB}$ level is gradually returned to normal after data is latched to the high-voltage output driver circuits. Experiments have indicated that such noise is minimized to acceptable levels if $V_{BB}$ 37 is reduced from its nominal value of approximately 55–60 volts to below battery voltage (12–16 volts) prior to activating strb 24a, although further improvements in noise reduction are realized if $V_{BB}$ is reduced to less than one (1) volt (ideally to ground potential).

In the example system shown in FIGS. 1–3, the high-voltage output driver circuits 38 must be capable of having data ($V_{L,i}$) latched thereto under reduced, or zero, power conditions. Thus, the high-voltage output section 36 must not require memory to function in order to implement the $V_{BB}$ reduction as described above.

Figure 4:
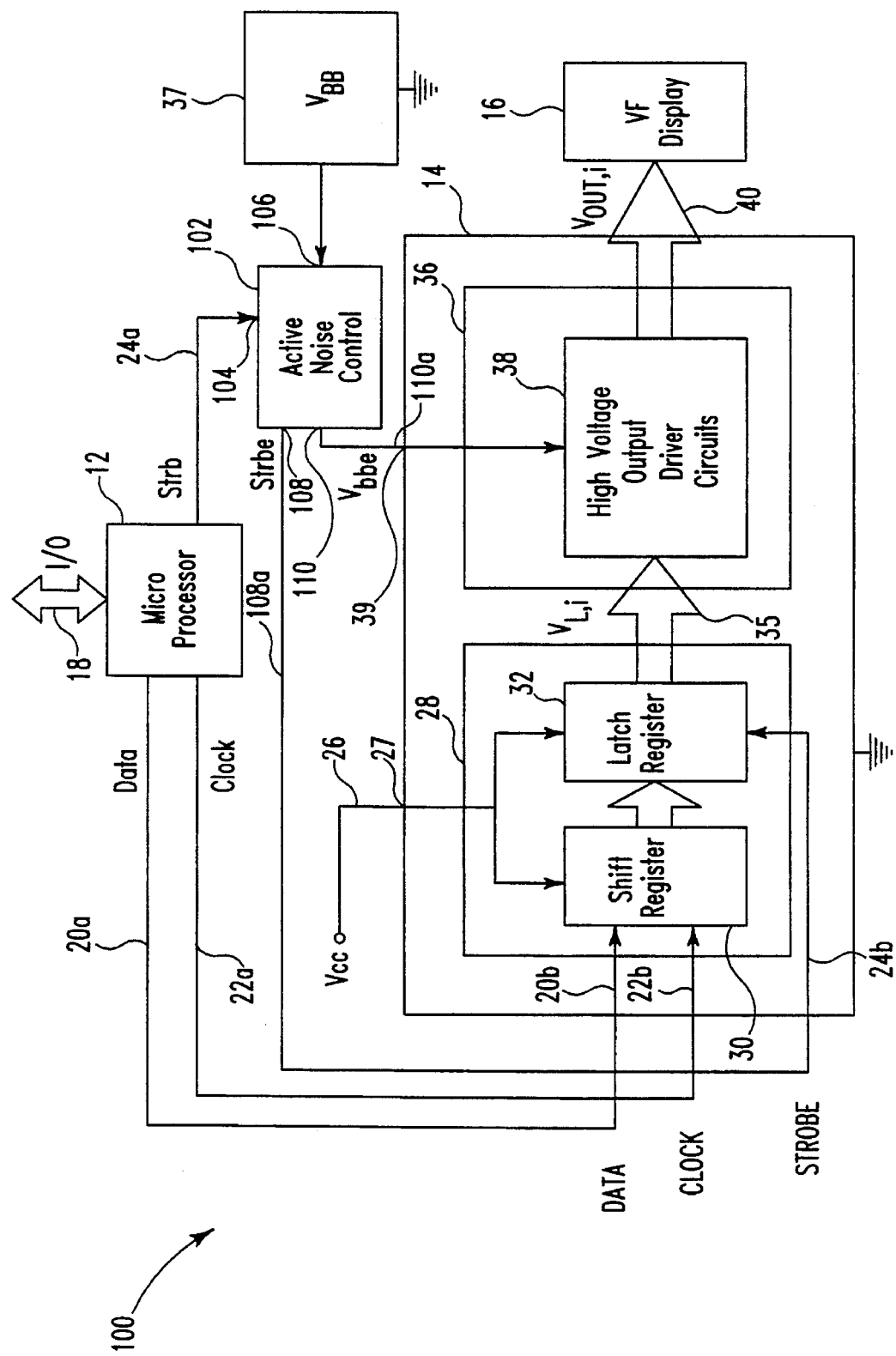
FIG. 4 is a schematic diagram showing a high-voltage load driving system according to one embodiment of the present invention.

Referring now to FIG. 4, a VF display driver system 100, in accordance with one embodiment of the present invention, is shown. Although the concepts of the present invention are shown as being applied specifically to a VF display driver system 100, it is to be understood that system 100 may be any high-voltage load driver system having radiated noise associated therewith. System 100 includes each of the components shown and described with respect to FIG. 1, and are therefore represented in FIG. 4 with identical reference numbers. System 100 is identical in most respects to system 10 with the exception that system 100 includes an active noise control circuit 102.

The high-voltage power source 37 preferably provides a high voltage supply ($V_{BB}$) of approximately 55–65 volts. However, the present invention further contemplates utilizing the concepts described herein to reduce radiated noise associated with a strobe event in any "high-voltage" system, wherein "high-voltage" is defined as any voltage greater than a logic-level voltage (typically 5.0 volts). In applying the concepts of the present invention in such a "high-voltage" system, noise reduction is not only a function of the rate at which $V_{BB}$ is increased and decreased, but is also a function of the ultimate voltage level to which $V_{BB}$ is reduced. Although the preferred "target" level is less than 1.0 volt, other considerations (timing constraints, system operation constraints, etc.) may not permit $V_{BB}$ to be reduced to less than 1.0 volt prior to a strobe event in certain applications. However, it is to be understood that any decrease in $V_{BB}$ prior to a strobe event, as more fully described hereinafter, will result in some noise reduction. Thus, some applications may require $V_{BB}$ to be reduced only to some predetermined level prior to activating a strobe event in order to effectuate noise reduction.

Active noise control circuit 102 includes a first input 106 connected to high-voltage power source 37 ($V_{BB}$), a second input 104 connected to the strb line 24a provided by microprocessor 12, a first output 108 for providing a strobe line 108a connected to the strobe input line 24b of high-voltage load driver IC 14, and a second output 110 for providing a supply voltage line $V_{bbe}$ 110a connected to the high-voltage input 39 of the high-voltage load driver IC 14.

Figure 5:
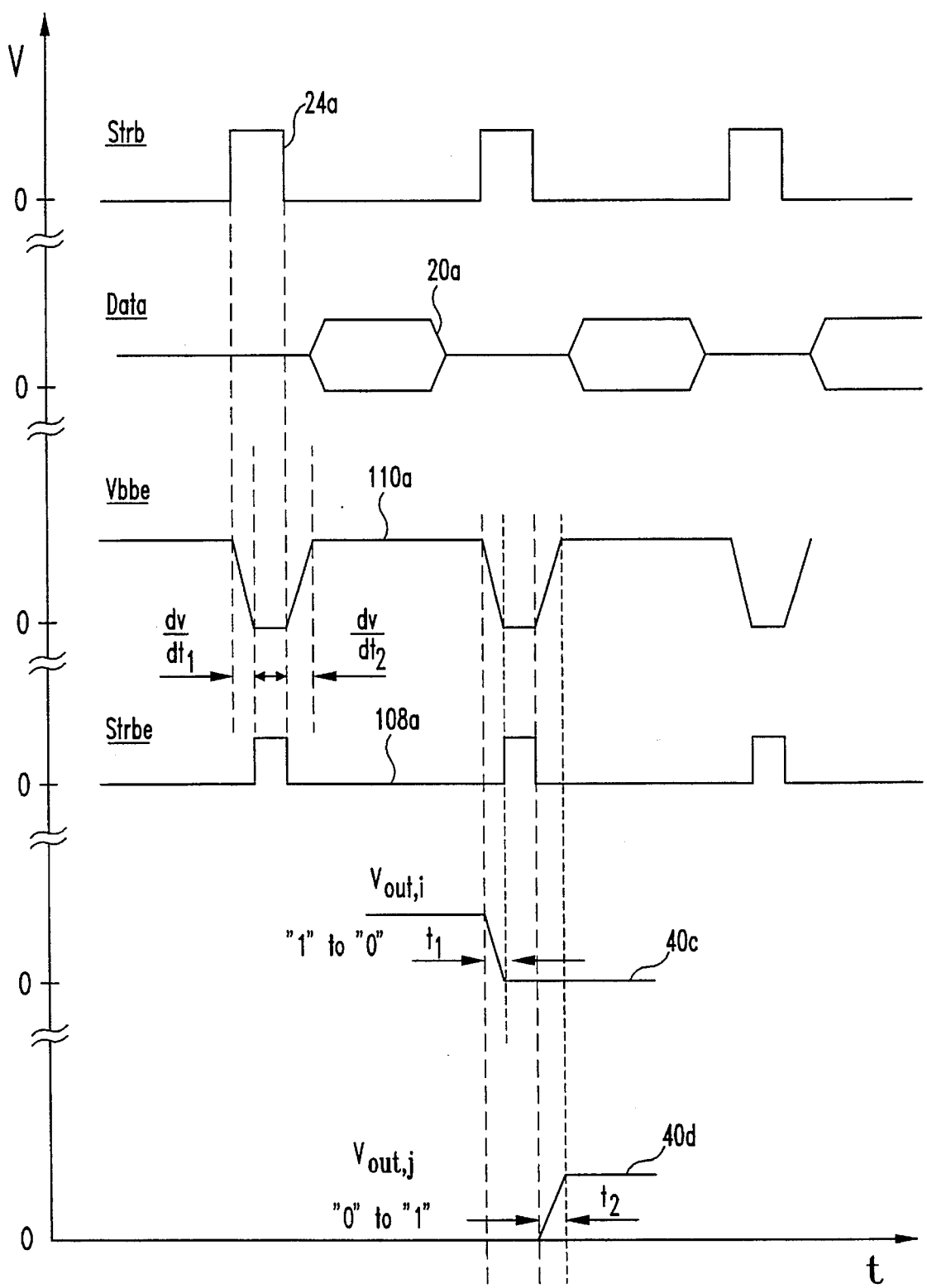
FIG. 5 is a waveform diagram showing typical operation of the high-voltage load driving system of FIG. 4.

Referring now to FIGS. 4 and 5, the operation of system 100 is similar to that of system 10 in that strb 24a is provided by microprocessor 12 to latch data 20a to the high voltage output driver circuit. However, strb 24a is received by active noise trap circuit 100 and provided to the load driver IC 14 as strbe 108a. Similarly, $V_{BB}$ 37 is received by active noise trap 100 and provided as $V_{bbe}$ 110a. When strb 24a is deactivated (disabled), active noise trap circuit 102 provides the high voltage $V_{BB}$ 37 as $V_{bbe}$ 110a, thus providing high-voltage load driver IC 14 with a supply of high voltage. Upon receiving an activation edge of strb 24a (a rising edge as shown in FIG. 5), active noise trap circuit 102 begins decreasing $V_{bbe}$ 110a at a predetermined rate $dv/dt_1$. Since $V_{bbe}$ should ideally be decreased over approximately 8 microseconds as previously described, it has been determined through experimentation that decreasing $V_{bbe}$ at a rate $dv/dt_1$ of between 5 and 20 volts/microseconds provides an acceptable reduction in radiated noise from IC 14 with a $V_{BB}$ of approximately 60 volts. After $V_{bbe}$ 110a has reached a predetermined voltage level (preferably ground potential, but may be some other voltage less than $V_{BB}$ as previously discussed), active noise trap circuit 102 provides a strbe signal 108a to thereby latch data from latch register 32 to the high-voltage output driver circuits 38 while $V_{bbe}$ 110a is below the predetermined voltage level described above. After strbe 108a is returned to its deactivated state, $V_{bbe}$ 110a is increased at a rate $dv/dt_2$ of between 1.5 and 3.5 times the rate of decrease $dv/dt_1$, to thereby provide a gradual power-up condition.

Each of the $V_{OUT,i}$ outputs 40c experience a high-to-low transition at the same rate as the rate of decrease $dv/dt_1$ of $V_{bbe}$ 110a. Thereafter, data is latched to the high-voltage output driver circuits 38 in accordance with the strbe signal 108a. Then, as $V_{bbe}$ 110a begins to increase after the strbe 108a event, any of the $V_{out,j}$ outputs 40d requiring a low-to-high transition do so at the same rate as the increase of $V_{bbe}$ 110a.

Figure 6:
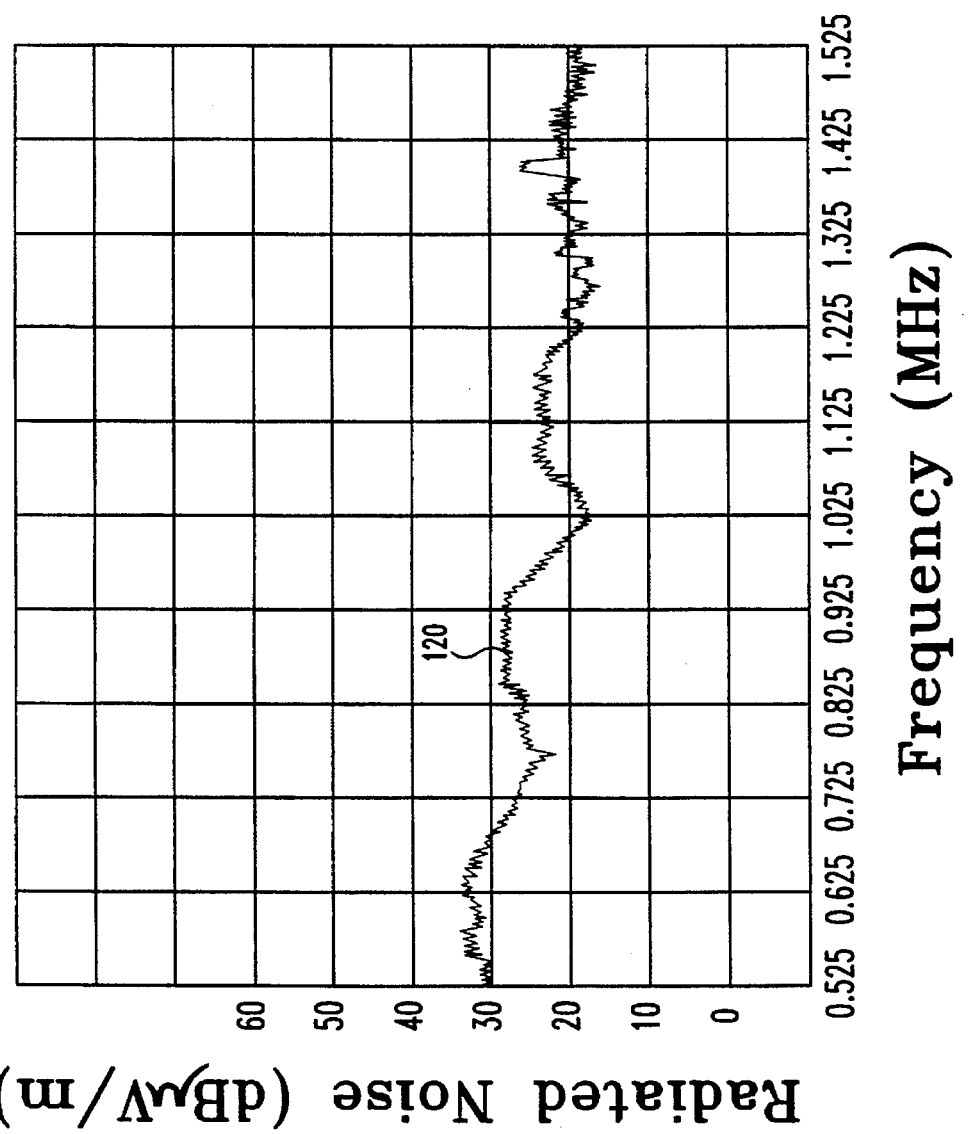
FIG. 6 is a plot of radiated noise versus frequency, showing AM band noise radiated from the high-voltage load driver IC of FIG. 4.

Referring now to FIG. 6, a plot of radiated noise 120 from high-voltage load driver IC 14, in the AM band of frequencies, is shown during typical operation of system 100. As is evident from FIG. 6, the radiated noise reduction theory and techniques described above have been implemented to provide a reduction in radiated noise of approximately 30 dbµv/m over the system shown and described with respect to FIGS. 1–3.

Figure 7:
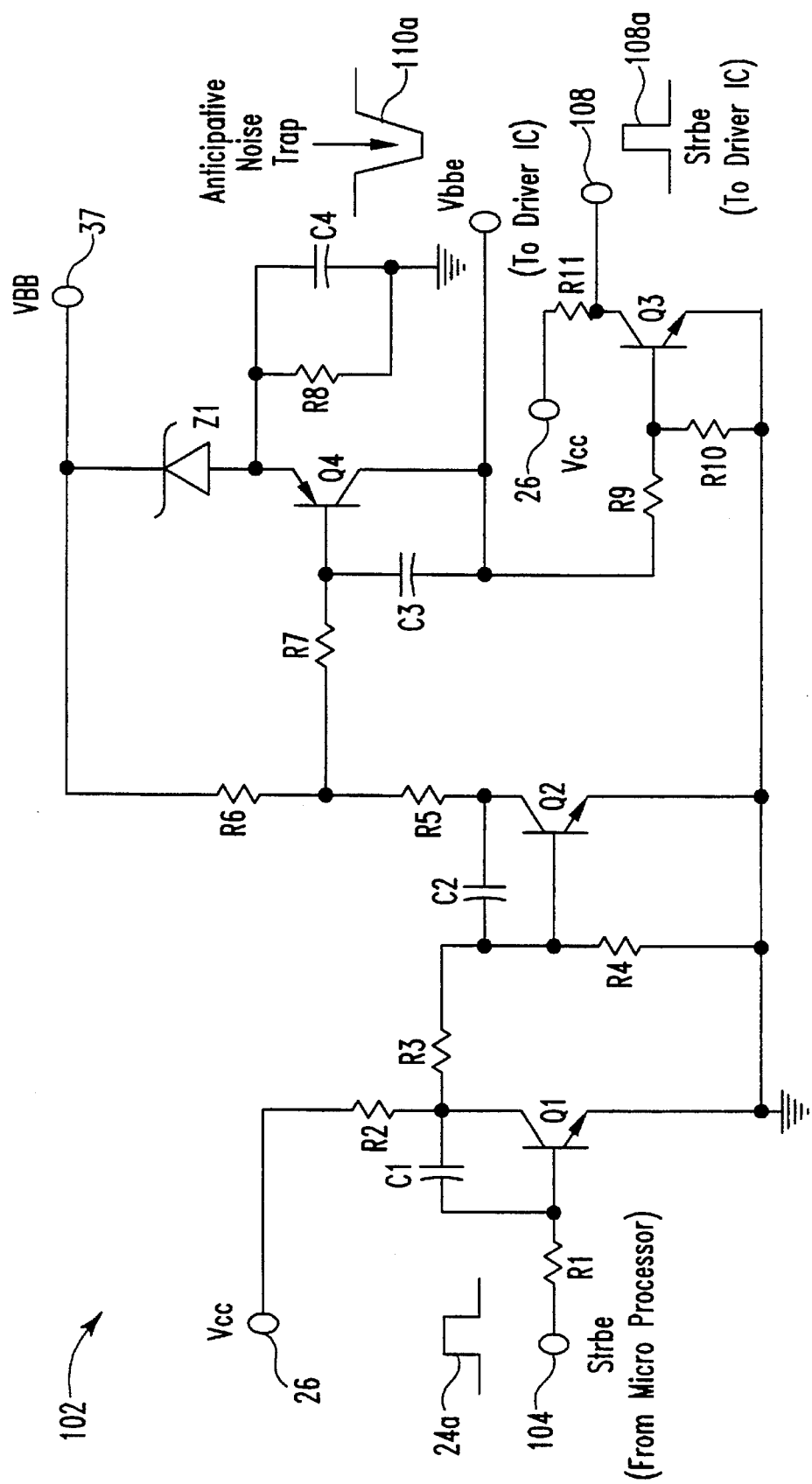
FIG. 7 is a schematic diagram showing one embodiment of a noise suppression circuit for use with the high-voltage load driving system of FIG. 4.

Referring now to FIG. 7, one embodiment of an active noise trap circuit 102, in accordance with the present invention, is shown. Circuit 102 includes a resistor R1 connected to strb input 104 and to the base of an NPN transistor Q1. A capacitor C1 is connected between the base and collector of Q1, which is further connected to $V_{CC}$ 26 through resistor R2. Resistors R1 and R2, capacitor C1 and transistor Q1 together form a first stage of circuit 102, wherein strb 104 is the input of the first stage and the collector of Q1 is the output of the first stage.

The collector of Q1 is further connected to a resistor R3 which is, in turn, connected to a capacitor C2, a resistor R4, and to the base of an NPN transistor Q2. The collector of Q2 is connected to an opposite end of C2 and to a resistor R5. R5 is connected to a resistor R6, which is further connected to $V_{BB}$ 37, and to a resistor R7. The opposite end of resistor R7 is connected to a capacitor C3 and to the base of a PNP transistor Q4. The emitter of Q4 is connected to $V_{BB}$ 37 through zener diode Z1, and to a parallel combination of resistor R8 and capacitor C4. The collector of Q4 is connected to C3 and to output $V_{bbe}$ 110. The circuit components R3 through the parallel combination of C3 and Q4 form a second stage of circuit 102, wherein R3 is the input of the second stage and $V_{bbe}$ 110 is the output of the second stage.

Output $V_{bbe}$ 110 is further connected to a resistor R9. The opposite end of R9 is connected to resistor R10 and to the base of an NPN transistor Q3. The collector of Q3 is coupled to $V_{CC}$ 26 through resistor R11, and is further connected to output strbe 108. Resistors R9, R10 and R11, and transistor Q3 form a third stage of circuit 102, wherein R9 is the input of the third stage and strbe 108 is the output of the third stage.

In operation, circuit 102 receives a strb signal 24a from the microprocessor 12, and provides an inverted form of this signal at the output of the first stage. Due to the capacitor C1, the inverted signal has a predetermined decrease and increase rate, $dv/dt_1$ and $dv/dt_2$, respectively. Preferably, C1 has a value of approximately 100 pico farads to provide a $V_{bbe}$ 110a decrease rate $dv/dt_1$ of between approximately 5 and 20 volts/microsecond. The second stage of circuit 102 is operable to receive the output of the first stage and provide $V_{bbe}$ 110a therefrom. Capacitors C2, C3 and C4 are operable in a known manner to more precisely control the increase and decrease rate of $V_{bbe}$ 110a. The third stage of circuit 200 is operable to receive $V_{bbe}$ 110a and provide the strbe signal 108a therefrom as previously described.

Figure 8:
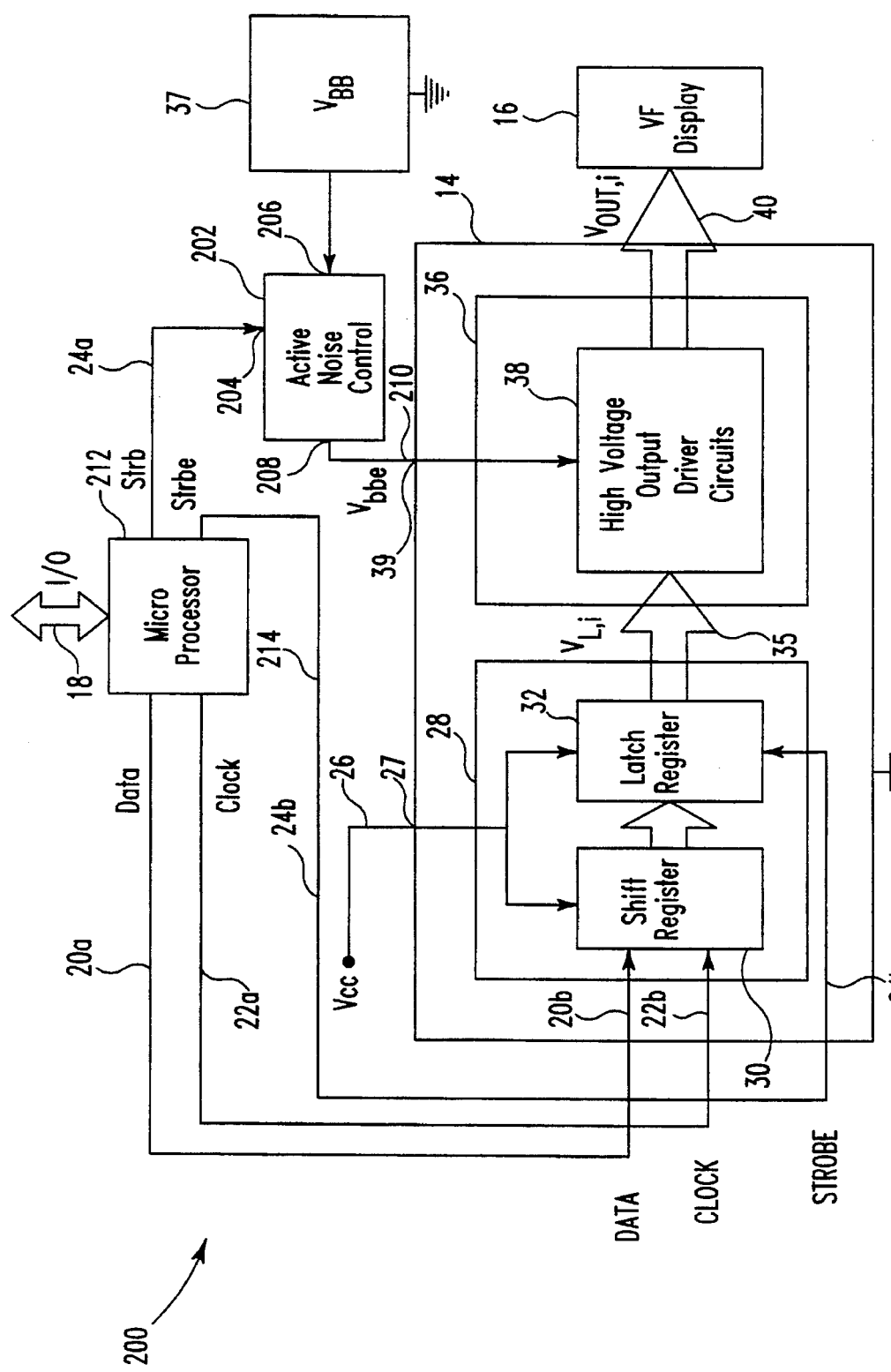
FIG. 8 is a schematic diagram showing a high-voltage load driving system according to an alternate embodiment of the present invention.

Referring now to FIG. 8, a VF display driver system 200, in accordance with an alternate embodiment of the present invention, is shown. VF display driver system 200 is, in many respects, identical in structure and operation to the VF display driver system 100 of FIGS. 4–7. Like numbers are therefore used to identify like components, and a description thereof is omitted for brevity.

An important difference in system 200 over system 100 is the inclusion of an alternate embodiment of an active noise control circuit 202. Like active noise control circuit 102 of FIG. 4, active noise control circuit 202 includes a first input 204 connected to the strb line 24a provided by microprocessor 212, a second input 206 connected to high-voltage power source 37 ($V_{BB}$), and an output 208 for providing a supply voltage line $V_{bbe}$ 210 connected to the high-voltage input 39 of the high-voltage load driver IC 14. Unlike active noise control circuit 102, however, active noise control circuit 202 does not include an strbe output. Rather, microprocessor 212 includes an strbe line 214 connected to the strbe input 24b of the high-voltage load driver IC 14.

Figure 9:
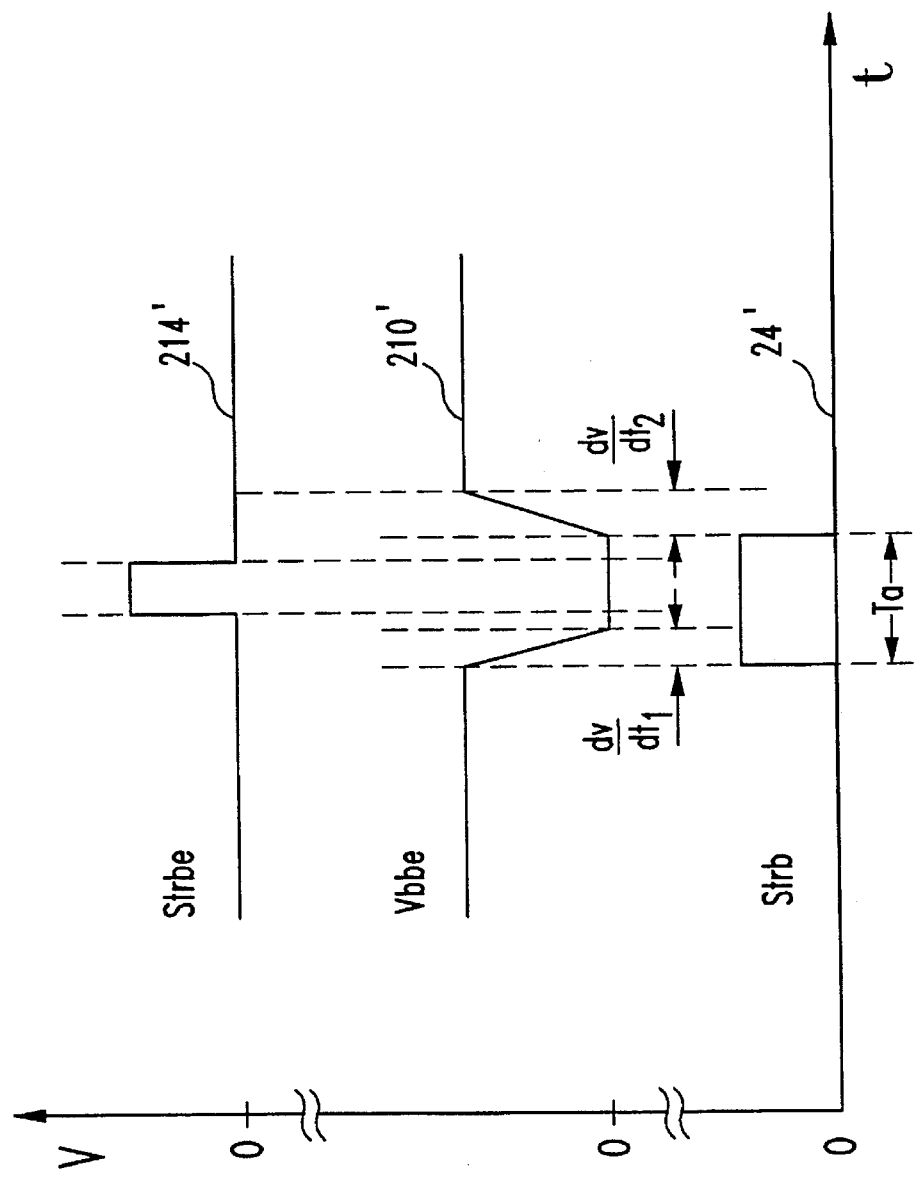
FIG. 9 is a waveform diagram showing typical operation of the high-voltage load driving system of FIG. 8.

Referring now to both FIGS. 8 and 9, the operation of VF display driver system 200 will now be described. As in system 100, microprocessor 212 provides high-voltage load driver IC 14 with appropriate data and clock signals on lines 20a and 22a, respectively, to thereby serially provide VF display data thereto. Similarly, microprocessor 212 provides active noise control circuit 202 with a strb signal 24' in order to latch data from the low-voltage circuitry 28 to the high-voltage circuitry 36 of high-voltage load driver IC 14. When strb 24' is deactivated (disabled), active noise control circuit 202 provides high voltage $V_{BB}$ 37 at output 208 so that $V_{bbe}$ is approximately equal to $V_{BB}$ when strb 24' is disabled. Preferably, strb 24' is disabled at a logic low level, although the present invention contemplates providing a deactivated, or disabled, strb 24' as a logic high level. When microprocessor 212 provides strb 24' with an activating edge, here a rising edge, active noise control circuit 202 is operable to gradually decrease $V_{bbe}$ 212'. As with active noise control circuit 102, $V_{bbe}$ is preferably reduced to a low voltage level of less than 1 volt, although the present invention contemplates that active noise control circuit 202 may be operable to reduce $V_{bbe}$ 210' to any final low voltage that is less than $V_{BB}$ 37. Also as with active noise control circuit 102, $V_{bbe}$ is preferably decreased at a rate $dv/dt_1$ of between approximately 5 to 20 volts/microsecond. It has been found through experimentation that in either active noise control circuit 102 or 202, a good target value for $dv/dt_1$ is approximately 10 volts/microsecond.

After $V_{bbe}$ 210' has reached its low voltage level, microprocessor 212 is operable to provide a strbe signal 214' to thereby strobe data from the low voltage circuitry 28 to the high voltage circuitry 36 of high voltage load driver IC 14. As with system 100, system 200 thus strobes data into the high voltage output driver circuits 38 of high voltage load driver IC 14 during the time that $V_{bbe}$ is held at a low voltage level by the active noise control circuitry of the present invention. Preferably, both the strb 24' activation time $T_a$ and the $V_{bbe}$ 210' decrease time $dv/dt_1$ are both known quantities so that microprocessor 212 can be programmed to provide the strbe signal 214' at the appropriate time as shown in FIG. 9.

After the strbe signal 214' latches data into the high voltage load driver IC 14, microprocessor 212 deactivates strb 24'. Coincident with the deactivation of strb 24', active noise control circuit 202 is operable to gradually increase $V_{bbe}$ back to the high voltage level $V_{BB}$ at a rate $dv/dt_2$. As with active noise control circuit 102, $dv/dt_2$ is preferably between approximately 1.5 to 3.5 times the rate $dv/dt_1$. Although not shown in FIG. 9, a low-level to high-level transition in any of the $V_{OUT,i}$ outputs occurs simultaneously with the increasing edge of $V_{bbe}$ 210', and at a rate of $dv/dt_2$.

Figure 10:
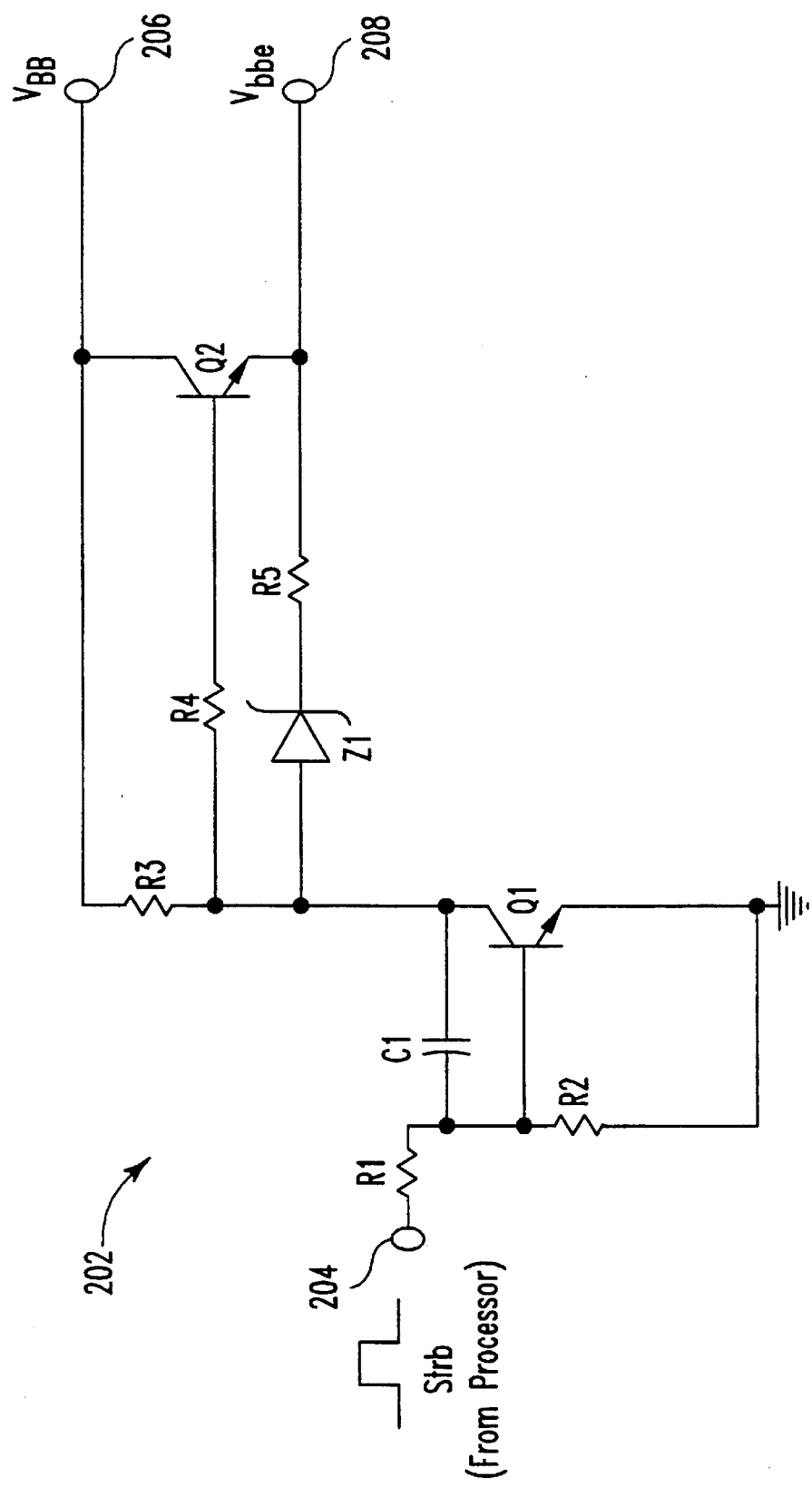
FIG. 10 is a schematic diagram showing another embodiment of a noise suppression circuit for use with the high-voltage load driving system of FIG. 8.

Referring now to FIG. 10, an alternate embodiment of an active noise trap circuit 202, in accordance with the present invention, is shown. Circuit 202 includes a resistor R1 connected to strb input 204 and to the base of an NPN transistor Q1. A capacitor C1 is connected between the base and collector of Q1, and the base of Q1 is further connected to ground potential through resistor R2. Resistors R1 and R2, capacitor C1 and transistor Q1 together form a first stage of circuit 202, wherein strb 204 is the input of the first stage and the collector of Q1 is the output of the first stage.

The collector of Q1 is further connected to a resistor R3 which is, in turn, connected to $V_{BB}$ input 206. The collector of Q1 is further connected to a resistor R4 which is, in turn, connected to the base of an NPN transistor Q2. Finally, the collector of transistor Q1 is connected to the series combination of a zener diode Z1 and a resistor R5 which is, in turn, connected to the emitter of transistor Q2 and output $V_{bbe}$ 208. The collector of transistor Q2 is connected to input $V_{BB}$ 206. The circuit components R3–R5, Z1 and Q2 form a second stage of circuit 202, wherein the R3, R4, and Z1 connection is a first input of the second stage, $V_{BB}$ 206 is a second input of the second stage, and $V_{bbe}$ 208 is the output of the second stage.

In operation, circuit 202 receives a strb signal 24a from microprocessor 212 at input strb 204, and provides an inverted form of this signal at the output of the first stage. Due to the capacitor C1, the inverted signal has a predetermined increased and decrease rate $dv/dt_1$ and $dv/dt_2$, respectively. Preferably, C1 has a value of approximately 100 pico farads to provide a $V_{bbe}$ 210' decrease rate $dv/dt_1$ of between approximately 10 volts per microsecond. The second stage of circuit 202 is operable to receive the output of the first stage and the high voltage supply signal $V_{BB}$ 37, and provide $V_{bbe}$ 210' therefrom.

In accordance with the present invention, either of the active noise control circuits 102 or 202, or similar such circuits, may be incorporated into a high voltage system, such as system 100 or 200 shown and described herein, to thereby reduce radiated noise associated with the operation of such high voltage systems. In any such system, noise will inherently be generated, wherein the amount of such noise is generally dependent upon the level of high voltage. In any such system, radiated noise can be reduced in accordance with the present invention by gradually decreasing the high voltage to a lower voltage level, preferably close to ground potential. Once the high voltage has been sufficiently decreased, a strobe event is activated and deactivated to thereby exchange or transmit data under low, or no, voltage conditions. Once data has been exchanged, transmitted, or latched, the high voltage is gradually increased to its original level. In order to provide such active noise control, the rate of high voltage increase and decrease should preferably be between approximately 5 to 20 volts/microsecond.

Figure 11:
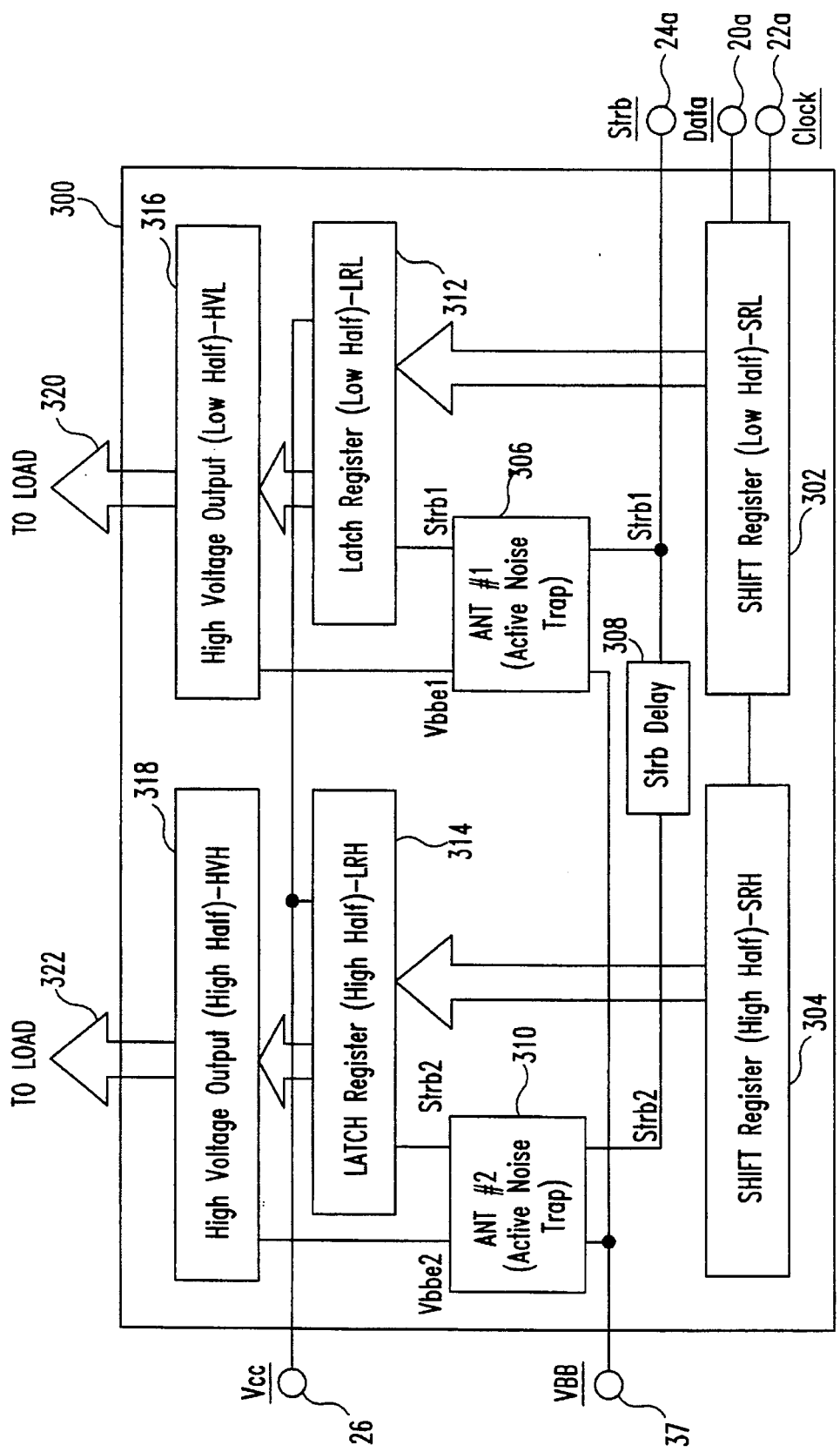
FIG. 11 is a schematic diagram showing an alternate embodiment of a high-voltage load driver IC in accordance with the present invention.

Referring now to FIG. 11, a high-voltage load driver circuit 300, in accordance with the present invention, is shown. Generally, high-voltage load driver circuit 300 includes a number of circuit blocks of known design therein, and further incorporates a pair of active noise trap circuits 310 and 312, each operable as described above. Circuit 300 may provide a direct replacement for high-voltage load driver circuit 14 of FIG. 1 to thereby provide a high-voltage load driving function with reduced noise radiated therefrom.

Circuit 300 includes a low-half shift register 302 and a high-half shift register 304, each under the control of a clock signal 22a, to receive data 20a relating to the state of the high-voltage outputs 320 and 322. A strb signal 24a is directed to active noise trap 306 circuit, and through a strb delay circuit 308 to a second active noise trap circuit 308. Each of the active noise trap circuits 306 and 308 are connected to a source of high-voltage 37 ($V_{BB}$). Shift register 302 is connected to a low-half latch register 312, which is also connected to low-half high-voltage driver output section 316 and to active noise trap circuit 306. Shift register 304 is connected to high-half latch register 324, which is also connected to high-half high-voltage driver output section 318 and to active noise trap circuit 310. High-voltage driver output section 316 is further connected to output port 320, and high-voltage driver output section 318 is further connected to output port 322.

In operation, high-voltage load driver circuit 300 operates identically to that of high-voltage load driver circuit 14 of FIG. 1, except that a pair of active noise trap circuits 306 and 310 are included to reduce, or suppress, noise generated by each of the low-half and high-half circuitries. Preferably, circuit 300 is provided as a single integrated circuit.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, although the invention has been shown and described as being operable to decrease noise generated from a load driver IC having memory (i.e., requiring a logic level voltage supply), it is to be understood that the concepts described herein may be applied to any known load driving circuit or system to thereby reduce noise radiated therefrom.

What is claimed is:

1. A noise suppression circuit for reducing noise radiated from a load driver circuit having a high-voltage supply input connected to a plurality of high-voltage driver circuits and a strobe input connected to a data latch circuit for latching low-voltage data to the plurality of high-voltage driver circuits, the noise suppression circuit comprising:

a first input connected to a signal source for receiving a first strobe signal therefrom;

a second input connected to a source of high-voltage; and a first output connected to the high-voltage supply input of the load driver circuit, said first output supplying high voltage from said second input to the high-voltage supply input of the driver circuit when said first strobe signal is deactivated, said first output decreasing said high voltage to a low voltage level at a predetermined decrease rate in response to an activating edge of said first strobe signal;

wherein the load driver circuit is responsive to a second strobe signal received at the strobe input thereof after said first output has decreased to said low voltage level to thereby latch low-voltage data to the plurality of high-voltage driver circuits.

2. The noise suppression circuit of claim 1 wherein said second strobe signal is provided by said signal source.

3. The noise suppression circuit of claim 1 further including a second output connected to the strobe input of the load driver circuit, said second output providing said second strobe signal.

4. The noise suppression circuit of claim 1 wherein said second strobe signal is deactivated while said first output is at said low voltage level.

5. The noise suppression circuit of claim 4 wherein said first output increases said low voltage level back to said high voltage at a predetermined increase rate in response to a deactivation edge of said first strobe signal.

6. The noise suppression circuit of claim 5 wherein said predetermined decrease rate is between 5 and 20 volts per microsecond;

and wherein said predetermined increase rate is a multiple of said predetermined decrease rate.

7. The noise suppression circuit of claim 6 wherein said multiple is between approximately 1.5 and 3.5.

8. The noise suppression circuit of claim 2 wherein said signal source is a computer.

9. The noise suppression circuit of claim 8 wherein said computer is a microprocessor based controller.

10. The noise suppression circuit of claim 8 wherein at least some of said plurality of high-voltage driver circuits have outputs connected to an electronic display;

and wherein said computer provides said first and second strobe signals to latch the low-voltage data to the high-voltage driver circuits to thereby activate said electronic display in accordance with the data.

11. The noise suppression circuit of claim 1 further including a first input stage having said first input thereto, third output and a capacitor connected therebetween, said first stage being responsive to said first strobe signal to provide an output signal at said third output;

wherein said capacitor is sized to provide said output signal with said predetermined decrease rate in response to said activating edge of said first strobe signal.

12. The noise suppression circuit of claim 11 further including a first output stage having said second input thereto, a third input coupled to said third output, and said first output provided therefrom, said first output stage being responsive to said output signal at said third output to provide said high-voltage at said first output when said first strobe signal is deactivated, and to decrease said high-voltage at said first output with said predetermined decrease rate in response to said activating edge of said first strobe signal.

13. The noise suppression circuit of claim 12 further including a second output stage having a fourth input coupled to said first output and said second output provided therefrom, said second output stage being responsive to said low voltage level at said first output to provide said second strobe signal at said second output.

14. A method of reducing radiated noise from a load driver circuit having a first input coupled to a source of high-voltage and connected to a plurality of high-voltage driver circuits, and a second input connected to a latch circuit for latching low-voltage data to the high-voltage driver circuits, the method comprising the steps of:

(1) decreasing the high-voltage level at the first input at a first predetermined rate;

(2) providing a strobe signal to the second input after the voltage level at the first input decreases to a first voltage level;

(3) deactivating the strobe signal at the second input after the low-voltage data is latched to the plurality of high-voltage driver circuits; and (4) increasing the voltage level at the first input from the first voltage level to the high-voltage level at a second predetermined rate.

15. The method of claim 14 wherein the first predetermined rate is between approximately 5 and 20 volts per microsecond.

16. The method of claim 14 wherein the second predetermined rate is a multiple of the first predetermined rate.

17. The method of claim 16 wherein the multiple is between approximately 1.5 and 3.5.

18. The method of claim 14 wherein the first voltage level is less than approximately 1.0 volts.

* * * * *